United States Patent [19]

Gassner et al.

[11] 4,093,248
[45] June 6, 1978

[54] PIVOTAL IMPLEMENT

[76] Inventors: Benno Gassner, D-8011 Haus near 14C; Johann Gassner, D-8011 Haus near 10, both of Goggenhofen, Germany

[21] Appl. No.: 779,965

[22] Filed: Mar. 22, 1977

[30] Foreign Application Priority Data

Mar. 22, 1976 Germany .................. 2612068

[51] Int. Cl.² ............................. B60G 17/00
[52] U.S. Cl. .......................... 280/6.1; 280/6 H; 180/41
[58] Field of Search ............ 280/6 H, 6 R, 6.1, 6.11; 180/41

[56] References Cited

U.S. PATENT DOCUMENTS

| 2,734,293 | 2/1956 | Barnes | 280/6 H |
| 4,033,423 | 7/1977 | Grosseau | 280/6 H |

Primary Examiner—Philip Goodman
Attorney, Agent, or Firm—Allison C. Collard

[57] ABSTRACT

A pivotal implement, such as a pivotal plow includes an implement frame having an axle extending longitudinally in the direction of travel which is pivotally supported on an undercarriage for movement relative thereto about its axle. The undercarriage includes a pair of spaced apart wheels each of which is supported by a transversely-extending axle which is coupled to the undercarriage for independent vertical movement in a substantially vertical direction, relative to the longitudinal axis of the undercarriage, for movement between an upper limiting position and a lower limiting position. Blocking means are associated with each of the wheel axles for preventing a tipping of the undercarriage relative to the implement frame about its longitudinal axis. Sensor means are also associated with each of the wheel axles which detect a change in position of the wheel axles and which move the blocking means into a blocking position when its associated wheel axle moves from its upper limiting position downwardly relative to the longitudinal axis.

11 Claims, 4 Drawing Figures

PIVOTAL IMPLEMENT

The present invention relates to a pivotal implement, in particular a pivotal plow, having an implement frame pivotally attached to an undercarriage and adapted to be moved relative to the undercarriage about a longitudinal axle extending in the direction of travel. The implement is also provided with a blocking means for preventing a tipping movement of the undercarriage relative to the implement frame about the longitudinal axle.

In view of the fact that this longitudinal axle is disposed relatively high, there is the increased danger that the weight of the implement, or plow, supported by the undercarriage, may cause the undercarriage to tip, whenever the ground surface shifts the longitudinal axle too far off to one side, so that the implements, or plow shares are lifted off the ground and fail to afford additional support thereon.

It has been attempted therefor to prevent tipping by means of specific constructions. For example, the pivotal undercarriage and the front end of the implement, supported on a tractor, have been interconnected by either mechanical or hydraulic devices in such manner that the pivotal undercarriage is prevented from carrying out any independent movements about its longitudinal axle relative to the front end of the implement. This, however, interferes with the adaptation of the pivotal frame to a rough terrain. Moreover, constructions of this kind are rather costly and in case of mechanical construction rather unwieldy. Since these constructions extend across the full length of the plow, or implement, they likewise interfere with an adaptation of the space between the front end of the plow frame and the pivotal undercarriage, when in a multi-share plow the number of plow shares is increased or decreased.

It is the object of the present invention to construct a pivotal implement of the aforestated kind in such a manner that the blocking means automatically carries out its blocking function, whenever there is a danger that the pivotal undercarriage might tip over.

It is another object to adhere to a construction which is simple and safe to operate and which prevents or minimizes any interference with any lengthening or shortening of the implement.

This object according to the present invention has been achieved, in that the wheel axles of the undercarriage are adapted to move individually in a substantially vertical direction relative to the longitudinal axle. With each of these wheel axles there is a sensor coordinated which reacts to any change in the relative position of the wheel axles and the longitudinal axle. The sensor is connected with the blocking means in such a manner that it places the blocking means in blocking position as long as the coordinated wheel axle moves from an upper limiting position in a direction downward relative to the longitudinal axle.

An advisable construction is provided in that the wheel axles each are adapted to pivotally move individually about substantially horizontal axles on the undercarriage extending substantially in the direction of travel.

According to a preferred embodiment, the blocking means is adapted to be hydraulically actuated. In a hydraulic line required for its control, a plurality of valves are disposed, each of which is coordinated with a wheel axle and each of which changes its operational condition whenever the wheel axles coordinated therewith moves away from its upper limiting position.

A further preferred embodiment is disclosed wherein the locking means comprises a lengthwise adjustable member being disposed between the plow frame on the one hand and the undercarriage on the other hand as a function of the movement of the plow frame and the undercarriage about the axis extending in the direction of travel, whereby in the blocking position, any adjustability is blocked.

In another embodiment, the blocking member comprises a hydraulic cylinder.

In a further preferred embodiment, the hydraulic cylinder is constructed as a single-acting cylinder, the hydraulic chamber of which is connected through the hydraulic line and the valves disposed therein are connected to a pressure reservoir.

It is advantageous that at least one lifting cylinder serves as a pressure reservoir for the pivotal implement and that the hydraulic line is adapted to be connected with the hydraulic system of a tractor. Another advantageous development shows the hydraulic cylinder as a double-acting cylinder, the two cylinder chambers of which are interconnected through the hydraulic line.

In further preferred embodiment of the present invention, the blocking means is provided with a freewheel, permitting a movement between the undercarriage and the implement frame opposite to the tipping direction of the undercarriage when the blocking means is in blocking condition.

Another preferred embodiment of the present invention has the freewheel constructed as a relief valve which bridges the valve in series connection in the hydraulic line.

Finally, in a particularly preferred embodiment, the valves coordinated with the wheel axles comprise a housing connected with the undercarriage and a sleeve valve disposed to move in the housing and provided with a restriction which in an opened condition is disposed in a radial plane in a diametrical bore extending across the housing and forming part of the hydraulic line. A tommy is connected with the sleeve valve which abuts the coordinated wheel axle in a biased fashion and the pivotal movement of the wheel axle relative to the undercarriage is restricted by means of abutments so that the valve is in opened position when the wheel axle is in its upper pivotal position.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawing, wherein similar reference characters denote similar elements throughout the several views.

Figure 1:
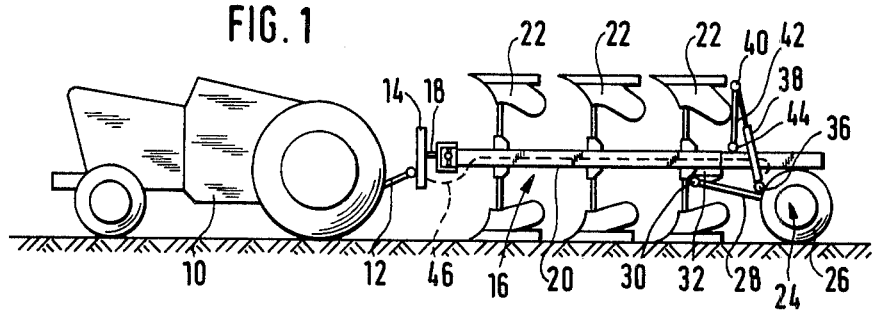
FIG. 1 is a schematic side elevation of a pivotal rotary plow in lifted-up position.

In FIG. 1, a tractor 10 is provided with a conventional hydraulic system to a hitch 12 of which is attached a front end frame 14 of a rotary plow attachment 16. A plow frame 20, adapted to rotate on axles disposed at 18 on front end frame 14, extends approximately in the direction of travel. Frame 20 is provided with a plurality of pairs of plow shares 22. Plow frame 20 is furthermore supported by a pivotal undercarriage 24 which is provided with two wheels 26, only one of which is shown in FIG. 1. Wheels 26 are pivotally hinged onto an intermediate member 32 by means of arms 28 pivotably coupled to a substantially horizontal axle 30 extending transversely to the direction of travel. Intermediate member 32 is, in turn, adapted to pivot relative to plow frame 20 about a horizontal axis 34 which is disposed substantially in the direction of travel. On each of the two arms 28, an upwardly extending lifting cylinder 38 is attached which is adapted to pivot about a ball joint 36, with the upper ends of the two lifting cylinders 38 to 40 jointly engaging in an all around movable fashion the upper end of a tie bar 42, the lower end of which is connected at 44 to plow frame 20 by means of a ball joint.

In case the plow is to be lifted up, the lifting off cylinders are charged by the hydraulic system of the tractor 10 with pressure through a schematically illustrated oil pressure line 46. This causes the piston rod to move out of the lifting cylinders. Consequently, joint 40 is lifted upwardly and, by means of the tie bar 42, the plow frame 20 is, in turn, lifted up, pivoting about axle 30 relative to undercarriage 24. At the same time, front frame 14 is lifted by means of hitch 12.

As soon as the plow has been either unhinged or turned into its transporting position, its center of gravity is disposed relatively high and the weight of the plow is no longer supported by the plow shares engaged with the ground. In case a rough terrain causes the undercarriage 24 to be pivoted about its axis 34 relative to plow frame 20, the danger arises that in case of too much tilting the center of gravity is placed outside the supporting surface and by a tipping of undercarriage 24, the rearward position of plow frame 20 is lowered. The device described herebelow prevents such a tipping.

The present invention is based on the concept that, at the beginning of the tipping process, the weight of the plow is supported by one of its two wheels 26, whereas the second wheel, bearing no weight at all, begins to lift off the ground. In order to deal with this condition mechanically, both wheels are disposed on short axles 48 which are adapted to pivot about axles 50 disposed in the direction of travel on a frame 52 of undercarriage 24. Whenever the wheels are weighted by the weight of the plow, they will pivot upwardly about axles 50 and will be held in a suitable direction of travel by means of an abutment 54 on the frame of undercarriage 52.

Whenever the undercarriage 24 begins to tip, one of the wheels 26 will be moved away from the abutment 54 and will lower itself. The pivotal movement about axle 50 is restricted by a lower abutment 56.

This downward pivotal movement of wheel axle 48 is sensed by a suitable sensor as the beginning of tipping and a blocking of the undercarriage 24 and of the plow frame 20 takes place, so that any further pivotal movement of the undercarriage, relative to the plow frame 24, about the axis 34 and thus a tipping of the undercarriage is prevented.

According to one embodiment of the invention, the sensor comprises on both of the wheel axles, a piston valve which includes a cylinder 62 provided with an axial bore 60, wherein a piston 64 is disposed so as to move in an axial direction. Piston 64 is provided with an annular restriction 66, with which, in an opened condition, a diametrical bore 68 in cylinder 62 is coordinated. On either side of bore 68 in cylinder 62 there are provided seals 70 and 72.

The lower end of each of the pistons 64, facing the axles 48, is connected with a tommy 74 which has a point 76, formed at its lower end, which engages a correspondingly shaped member 78 on the upper surface of wheel axles 48. A pressure spring 82 is provided on the tommy 74 between the lower end of cylinders 62 and a collar 80 is adapted to hold the tommy in engagement with member 78.

Whenever wheel axle 48 moves downward, tommy 74 participates in the movement so that annular restriction 66 moves out of the area of the bore 68 in a downward direction and bore 68 is interrupted. The valve is then closed.

Piston valves 58 which are coordinated with the two wheels 26, are connected in series so that a hydraulic line 84 passing through both of these valves is interrupted when one of the two wheels 26 is relieved of its load.

Figure 2:
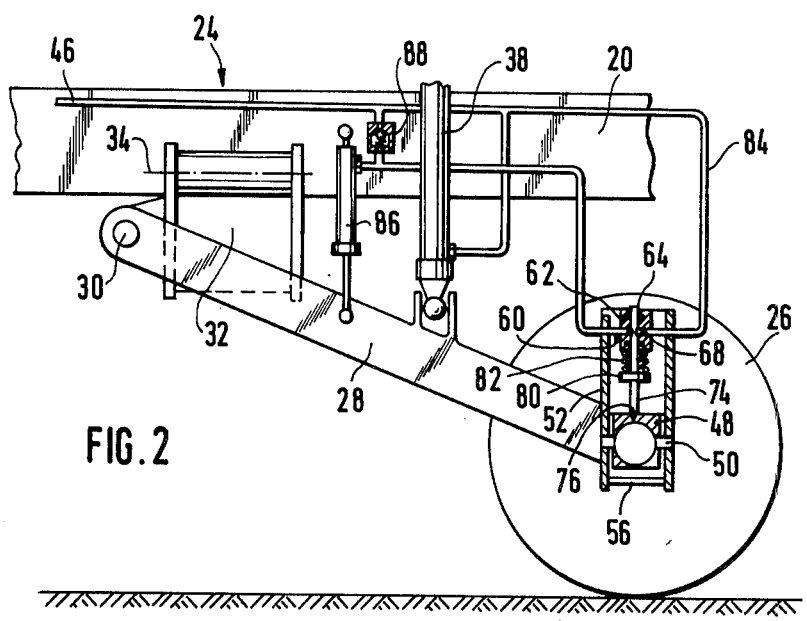
FIG. 2 is a side elevation of the rotary undercarriage with the tipping block according to the present invention.
Figure 3:
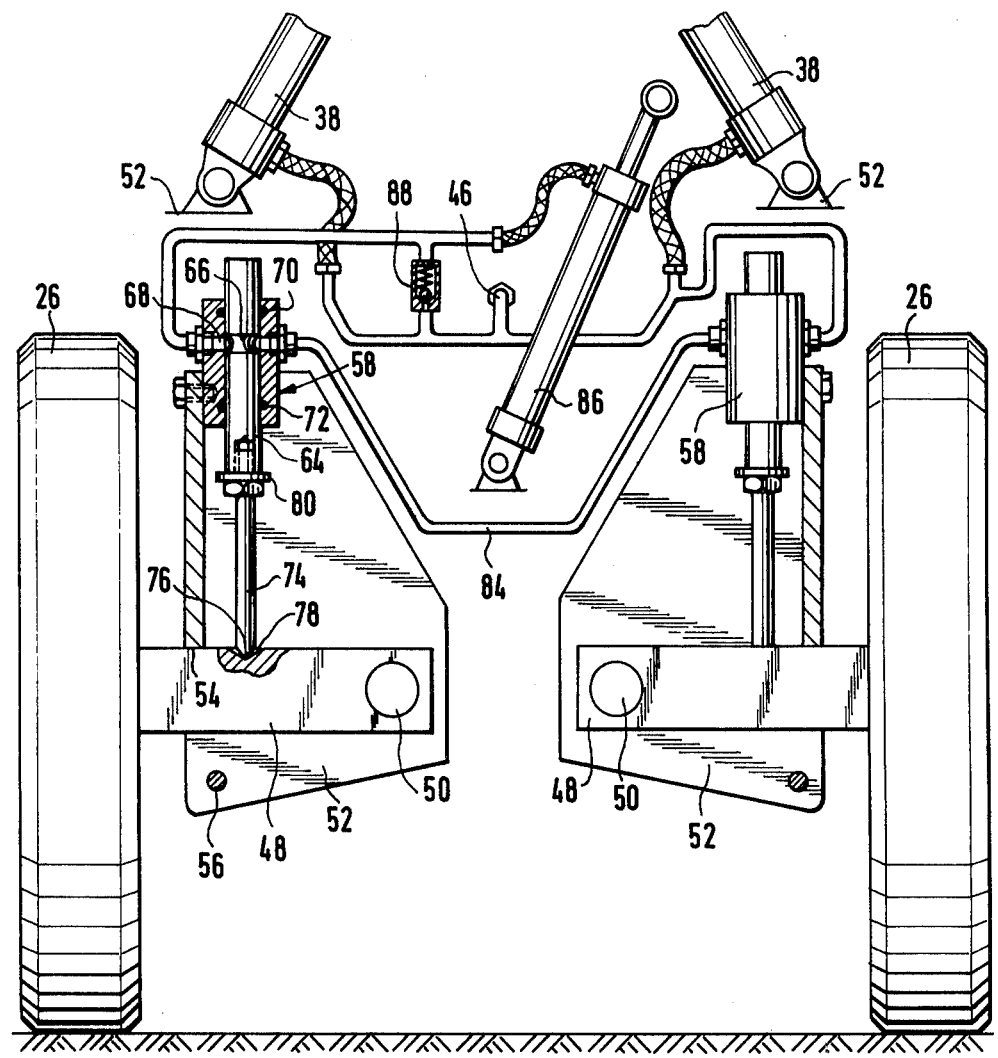
FIG. 3 is a schematic rear view of the device according to the present invention, showing for the sake of clarity merely the hydraulic system in connection with the two wheels and the wheel axles of the undercarriage.

According to the embodiment illustrated in FIGS. 2 and 3, hydraulic line 84 is supplied with pressure via line 46 by the hydraulic system of the tractor. The weight of the plow, acting on both of the lifting-off cylinders 38, activates these to function as pressure reservoirs which provide the pressure required in line 84. The end of this line which is remote from the connection to the hydraulic line 46, is connected with the chamber of a single-acting hydraulic cylinder 86 in such a fashion that a flowing out of pressure oil from this cylinder is prevented as soon as one of the piston valves 58 is in a blocked condition. The hydraulic cylinder 86 is disposed between undercarriage frame 52 and plow frame 20 in such a manner that the volume of the cylinder chamber is reduced when undercarriage 24 moves in a tipping direction relative to plow frame 20. When hydraulic line 84 is interrupted, the tipping movement of undercarriage 24 relative to plow frame 20 is blocked.

A return of undercarriage 24 to its normal position is carried out with the aid of a short-circuit connection, with a check valve between hydraulic cylinder 86 and hydraulic line 46, which permits the pressure oil to reach cylinder 86, but prevents a flowing out of pressure oil via hydraulic line 46 and by-passes hydraulic line 84.

Figure 4:
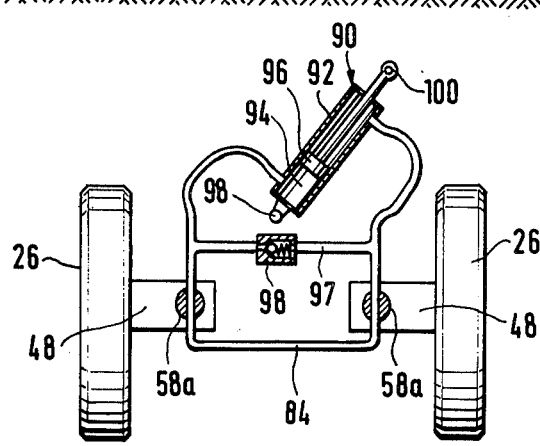
FIG. 4 is an illustration according to FIG. 3 depicting another embodiment of the invention.

FIG. 4 illustrates a variation, according to which single-acting cylinder 86 has been replaced by a double-acting cylinder 90, the cylinder chambers 92 and 94 of which are connected through hydraulic line 84 as a closed system on either side of a piston 96. Line 84 is neither connected to lifting cylinders 38 nor to hydraulic line 46. The two valves are arranged in series in hydraulic line 84 and are shown in this embodiment as rotary slide valves 58a. Valves 58a are bridged by means of a by-pass line 97, wherein a reaction valve 98 is disposed in such a manner that undercarriage 24 is returned to its normal position, thereby shortening the distance between points 98 and 100 on hydraulic cylinder 90 on undercarriage 24, or on plow frame 20, respectively, although one of the two valves 58a has been closed. No change of the position of the undercarriage in the tipping direction and thereby no increase in the spacing of points 98 and 100 is possible as long as one of the valves 58a is in blocking position.

The illustrated embodiments have shown that the construction according to the present invention is relatively simple and offers the advantage that the coming into force of the tipping blockage is not dependent upon a definite angle between undercarriage and plow frame, but that the tipping blockage automatically become effective when the undercarriage shows an inclination to tilt by a lowering of one of the wheels 26.

Moreover, it will be seen that in realizing the concept of the present invention it is merely important to ascertain the point in time when one of the two wheels is relieved of its load and, as a function of the signal thereby effected, to block the movement in the direction of tipping of the undercarriage relative to the plow frame. It is not necessary that the wheels are disposed on pivotal axles, as has been described in the above embodiments. It would be feasible to have the wheels extend vertically in a linear fashion, to provide springs for cushioning against the undercarriage, or against the longitudinal axle connecting the undercarriage to the plow frame, to independently dispose the arms 28 in movable fashion about the axle 30, or to provide within the arms 28 a joint each which comprises a hinge axle extending transverse to the direction of travel.

While only a few embodiments of the present invention have been shown and described, it will be obvious to those skilled in the art that many changes and modifications may be made thereunto without departing from the spirit and scope of the invention.

What is claimed is:

1. A pivotal implement, such as a pivotal plow, comprising:
   an implement frame having an axle extending generally longitudinally in the direction of travel about which said frame may pivot;
   an undercarriage on which said implement frame is pivotably supported for movement relative to said undercarriage about said longitudinal axle, said undercarriage including at least one pair of spaced-apart wheels and at least one pair of transversely-extending wheel axles, each of which supports one of said wheels and each of which is coupled to said undercarriage for independent movement in a substantially vertical direction, relative to the longitudinal axis of said undercarriage, between an upper limiting position and a lower limiting position;
   blocking means associated with said wheel axles for preventing a tipping movement of said undercarriage relative to said implement frame about said longitudinal axle, said blocking means being movable between a blocking position and an unblocking position for respectively preventing and permitting movement of said wheel axles; and
   sensor means associated with each of said wheel axles which are responsive to a change in position of its associated wheel axle relative to said longitudinal axle and which are coupled to said blocking means and which move said blocking means into a blocking position when the associated wheel axles moves from said upper limiting position downwardly relative to said longitudinal axle.

2. The pivotal implement according to claim 1 wherein said undercarriage includes a frame member and at least one pair of horizontally-disposed frame axles supported on said frame member and extending generally in the direction of travel, and wherein each of said wheel axles is independently supported by one of said frame axles for pivotal movement thereabout.

3. The pivotal implement according to claim 1 wherein said blocking means comprises a hydraulically-actuated member, a hydraulic line coupled to said blocking means and a plurality of valves disposed in series in said hydraulic line for controlling movement of said blocking member, said valves each being responsive to movement of one of said wheel axles such that each of said valves changes its operational condition whenever its associated wheel axle moves away from its upper limiting position.

4. The pivotal implement according to claim 3, wherein said blocking member comprises a member which is longitudinally adjustable as a function of the movement of said implement frame relative to said undercarriage about said longitudinal axis disposed in the direction of travel, the adjustability of said member being blocked when placed in blocking position.

5. The pivotal implement according to claim 4, wherein said blocking member comprises a hydraulic cylinder.

6. The pivotal implement according to claim 5, additionally including a pressure reservoir and wherein said hydraulic cylinder is a single-acting cylinder having a hydraulic chamber in which said valves are disposed, said chamber being connected through said hydraulic line to said pressure reservoir.

7. The pivotal implement according to claim 6, wherein said pressure reservoir is formed by at least one lifting cylinder and wherein said hydraulic line is connectable to the hydraulic system of a tractor.

8. The pivotal implement according to claim 5, wherein said hydraulic cylinder is a double-acting cylinder having two cylinder chambers which are interconnected through said hydraulic line.

9. The pivotal implement according to claim 3, wherein said blocking member includes a free wheel which permits movement of said undercarriage relative to said implement frame against the tipping direction of said undercarriage, even when said blocking member is in blocking position.

10. The pivotal implement according to claim 9, wherein said free wheel comprises a check valve which bridges the valves disposed in series in said hydraulic line.

11. The pivotal implement according to claim 3 wherein said valves associated with said wheel axles each comprise a cylinder housing having an axial bore formed therein and also a diametrical bore extending thereacross communicative with said hydraulic line, a piston slidably mounted within said axial bore of said housing having an annular restriction which, when in an opened position, is disposed opposite said dimetrical bore, and a spring-biased tommy coupled to said piston which is disposed to abut the associated wheel axle, and wherein said implement additioning includes a pair of abutments associated with each of said wheel axles which limit pivotal movement of said wheel axles relative to said undercarriage in such a manner that said piston is moved to said opened position thereof when its associated wheel axle is in its upper limiting position.

* * * * *